United States Patent
Hunter et al.

[11] Patent Number: 5,993,648
[45] Date of Patent: Nov. 30, 1999

[54] WATER FILTRATION DEVICE WITH A WATER FOUNTAIN OUTLET AND A FAUCET OUTLET WITH FLOW VIEWING APPARATUS

[75] Inventors: Brian D. Hunter, Nederland; Jeffrey K. Aldred, Boulder; Kraig J. Koski, Longmont; Ralph Burns, Boulder, all of Colo.

[73] Assignee: American Standard, Inc., Piscataway, N.J.

[21] Appl. No.: 09/042,905

[22] Filed: Mar. 17, 1998

[51] Int. Cl.⁶ .......................... B01D 17/12; B01D 35/02; B67D 5/37
[52] U.S. Cl. .......................... 210/94; 137/801; 210/418; 210/449; 210/460; 239/25
[58] Field of Search .................. 210/87, 94, 95, 210/449, 460, 767, 418; 137/801; 239/24, 25

[56] References Cited

U.S. PATENT DOCUMENTS

| | | | |
|---|---|---|---|
| 736,107 | 8/1903 | Johnston | 210/449 |
| 745,912 | 12/1903 | Schissel | 210/449 |
| 1,395,321 | 11/1921 | Williams | 239/449 |
| 2,474,286 | 6/1949 | Snyder | 239/25 |
| 3,237,863 | 3/1966 | Wollmer Shauser | 239/25 |
| 3,325,101 | 6/1967 | Cuschera | 239/25 |
| 3,682,386 | 8/1972 | Herman et al. | 239/25 |
| 3,760,951 | 9/1973 | Mansfield | 210/449 |
| 3,853,761 | 12/1974 | McClory | 210/449 |
| 4,330,093 | 5/1982 | Chapman et al. | 242/7.17 |
| 4,686,037 | 8/1987 | Lang | 210/449 |
| 5,527,451 | 6/1996 | Hembree et al. | 210/449 |
| 5,744,033 | 4/1998 | Bertrand et al. | 210/460 |
| 5,823,229 | 10/1998 | Bertrand et al. | 210/449 |
| 5,858,215 | 1/1999 | Burchard et al. | 210/449 |

*Primary Examiner*—Joseph W. Drodge
*Attorney, Agent, or Firm*—Duft, Graziano & Forest, P.C.

[57] ABSTRACT

A faucet-mounted water filtration device includes a gate valve that is used to select between discharge options. The gate valve contains a thumb rest which is configured to allow manual valve actuation while supportedly engaging a user's thumb. First discharge option includes a conventional bottom discharge into a sink. A second discharge option exists as a water fountain that is formed as a compact, integral feature of the water filtration device. A flow indicator permits a user to check whether the filtration cartridge is working properly.

17 Claims, 2 Drawing Sheets

WATER FILTRATION DEVICE WITH A WATER FOUNTAIN OUTLET AND A FAUCET OUTLET WITH FLOW VIEWING APPARATUS

SUMMARY OF THE INVENTION

The present invention involves a faucet-mounted water filtration device having a selectively operable valve that can be used as a water fountain. More particularly, the valve is used to select between two outlets. A gate valve is normally biased to discharge a downwardly directed stream of water from a first outlet. The gate valve is manually actuated for selective discharge of water from a second outlet that acts as a drinking fountain.

PROBLEM

Faucet-mounted water filtration and purification devices are used to remove impurities from potable water. An inlet of the filtration device is coupled with a conventional faucet outlet for receipt of water from the faucet. The filtration device has a filter, e.g., a canister of activated carbon, that receives water from the inlet and removes impurities. The clean water flows though an outlet for point of use delivery.

Conventional faucet mounted filtration devices have a serial flowpath, such as that shown in U.S. Pat. No. 5,527,451 to Hembree et al. The water flows into the inlet, through the filter, and then out the outlet. The inlet is typically on top of the filtration device, and the outlet is on the bottom. Water conventionally exits the bottom outlet flowing in a downward stream. This downward flow configuration is generally convenient to the user because this is how the water would be delivered if the faucet did not have the attached filtration device. A valve may be used to bypass the filter entirely, but the bypass discharge is still on the bottom of the filtration device.

The conventional downward discharge configuration creates difficulty when a user wants a drink of water. The user has to get a vessel, such as a cup, to hold the water for drinking purposes. The vessel is placed under the outlet for filling. People who only want a small drink and do not want to soil a cup for a small drink find that drinking directly from the downward stream is either impossible or socially unacceptable.

A further problem with water filtration systems is an inability to check for leakage around the filter or other malfunctions in the flow pathway. Filtration systems are constructed of an opaque plastic or metal because debris accumulated on the inlet side of the filter can appear unsightly and unappetizing if it is exposed to view. The user cannot detect a problem with the filtration system because there is no way to see inside. Thus, consumers have concern that the filtration device may not be working properly, and that the problem may remain undiagnosed for an extended time.

SOLUTION

The present invention overcomes the aforementioned problems by providing a compact faucet-mounted water filtration device having an integrally formed drinking fountain assembly. There is also provided a visual flow indicator to assure users that the filtration device is functioning correctly. Users are advantaged by the present invention because the water fountain is used to get drinks of water from the filtration device without using a vessel, such as a cup. The user may use a standard bottom outlet, which permits a larger flow rate in obtaining larger quantities of water.

A water filtration device according to the present invention includes two outlets for point of use water delivery. A first outlet provides a downwardly directed stream of discharged water, and is preferably used in combination with a flow indicator. A second outlet functions as a water fountain providing an upwardly directed stream of discharged water. A valve is used to select between the outlet discharge options. A flow indicator assembly is optionally positioned in the internal flow pathway on an outlet side of the filter to show movement of filtered water.

In preferred embodiments, a gate valve on the outlet side of the filter is used to select between the outlet discharge options. The user actuates the gate valve to a position corresponding to a selected one of the two outlets. The gate valve is normally biased towards a first position that directs water to the downward path and out the bottom of the filtration unit. The user manually actuates the gate valve to a second position that directs the water through a chamber leading to the second outlet, which discharges the stream of water in a substantially upward direction. The direction of discharge is also slightly to the side for preventing the upwardly directed stream from falling back to strike the filtration system housing under the influence of gravity. Thus, gravity causes the water flowing in the upward position to create an arc as the water falls to a sink or basin. Spring bias returns the gate valve to the first position when the user releases the gate valve.

The present invention also permits a visual check or inspection of water flowing through the filtration device. The downward outlet has a transparent window in the wall of the flow path. A paddlewheel is retained proximate the window and inside the flow path on the outlet side of the filter. Water flowing through the flow path provides spinning motion by pushing the paddles of the paddlewheel. The spinning paddlewheel is visible through the window, and indicates that the filtration system is working properly because there are no leaks bypassing a filtration cartridge internal to the filtration device. The user knows the filtration device is malfunctioning if the wheel is not spinning, and the user must either repair or replace the filter.

The two outlets of the present invention offer features of convenience in a water filtration device. The water fountain outlet provides an easy method for a user to drink the water from the filtration device, while the second outlet provides the typical capabilities of a faucet. The paddlewheel flow indicator provides an easy method for determining whether there are flow problems within the filtration device.

DETAILED DESCRIPTION OF THE PREFERRED EMBODIMENT

Figure 1:
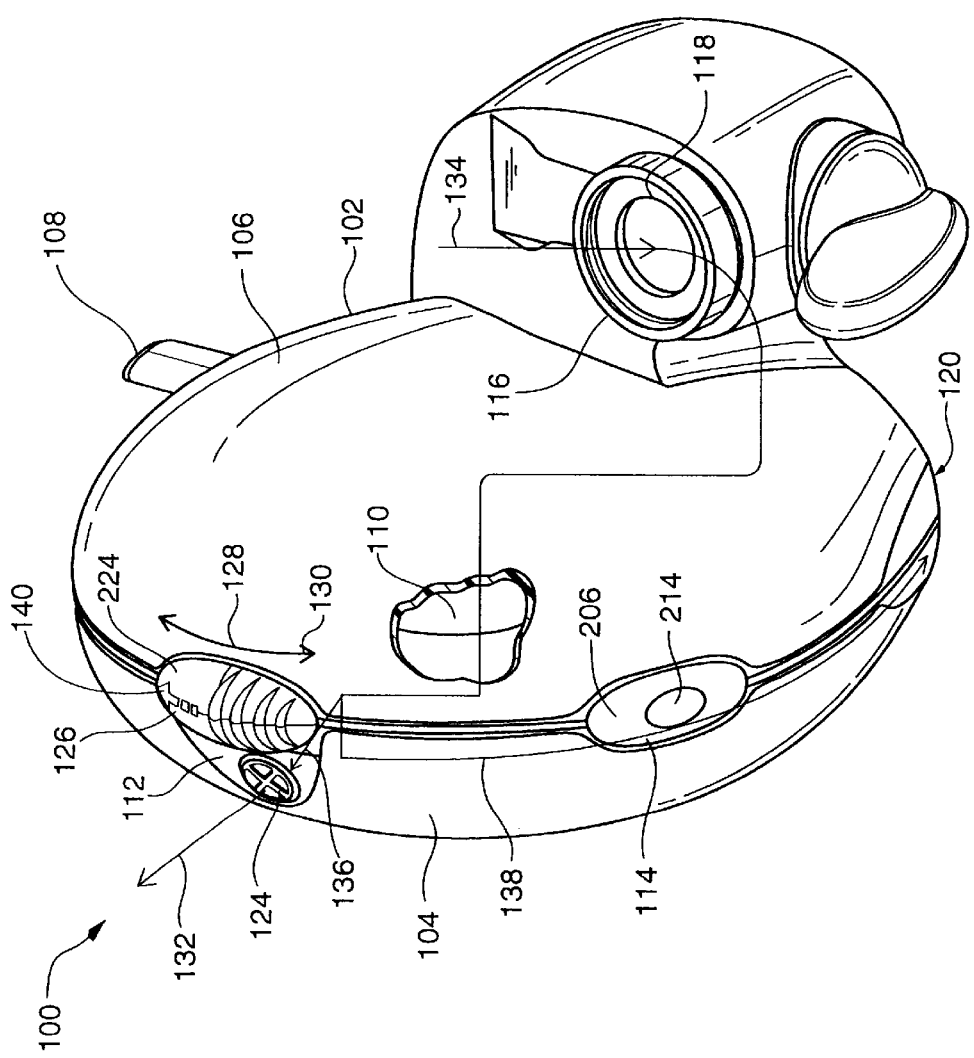
FIG. 1 illustrates a right, top, elevational perspective view of a water filtration system having a water fountain and flow indicator according to the present invention.

FIG. 1 depicts a water filtration device 100 according to the present invention. Water filtration device 100 includes a housing 102 having a left concavo-convex shell 104 and a right concavo-convex shell 106, which are held in bivalve mating engagement by bayonet latch mechanism 108. The mating of concavo-convex shells 104 and 106 provides an internal cavity where a suitable filter, e.g., a cylindrical activated carbon filter 110 (shown with a portion of shell 106 removed for purposes of illustration) is operably retained. Concavo-convex shell 104 is bonded to a water fountain assembly 112 including a flow indicator assembly 114. A thread-on connector 116 provides a means for thread-on coupling of filtration device 100 with a conventional water faucet outlet. Inlet 118 of connector 116 is the first part of a flow pathway leading into water filtration device 100, through the internal filter 110, and exiting first outlet 120.

Figure 2:
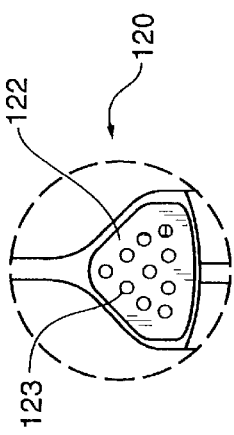
FIG. 2 illustrates a flow outlet of the FIG. 1 water filtration system.

FIG. 2 shows a bottom perspective view of first outlet 120 including a central aerator 122. Water fountain assembly 112 includes a second outlet 124 and a gate valve 126.

The internal flow configuration of water filtration device 100 is such that water may be made to flow from one of first outlet 120 or second outlet 124 by selective actuation of gate valve 126 along the track indicated by double headed arrow 128. Gate valve 126 is spring biased in the direction shown by end 130 of arrow 128, which normally positions gate valve 126 for selective discharge from first outlet 120. Water leaving second outlet 124 is discharged in a substantially upward direction 132 with some left side vectoring as well, e.g., discharging leftward at an angle deviating 10° to 60° from vertical, and more preferably deviating 15° to 45° from vertical.

Figure 3:
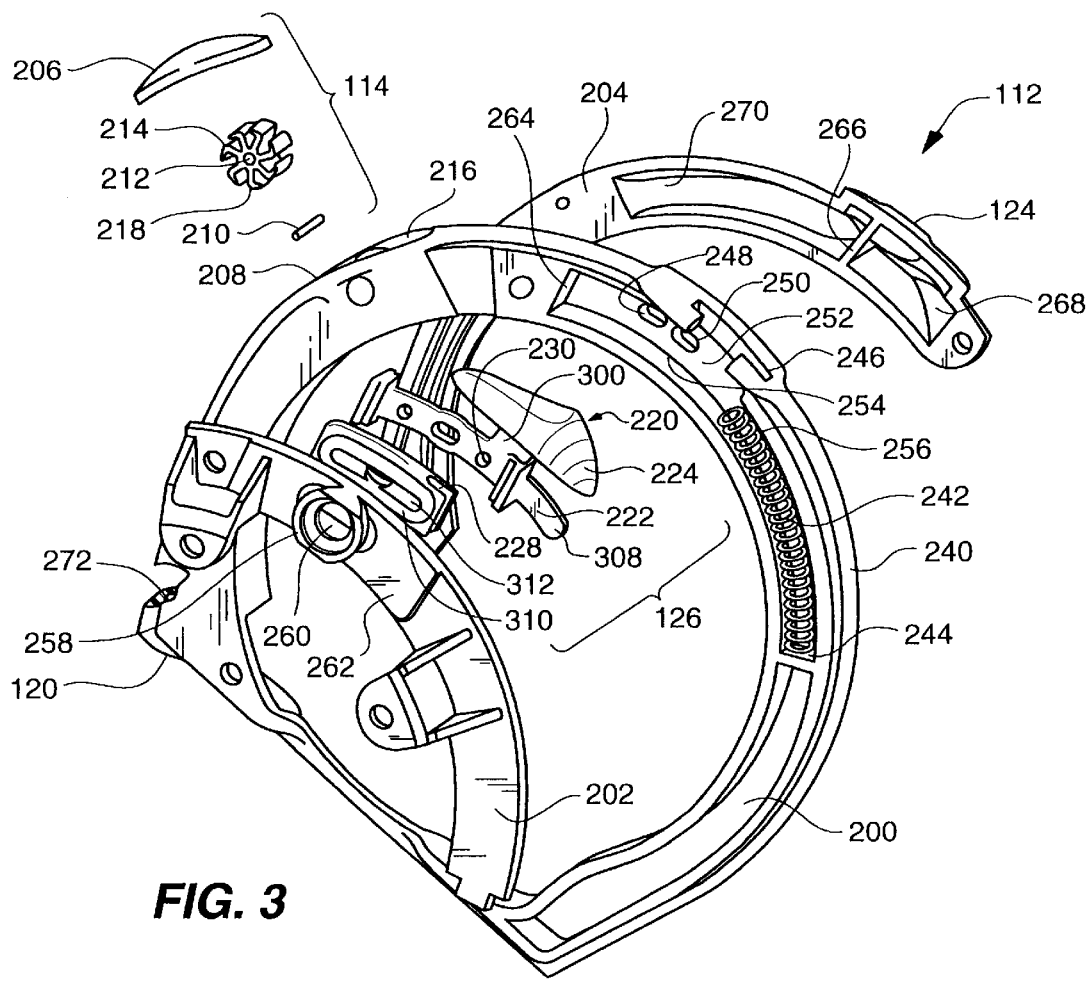
FIG. 3 illustrates an assembly view of an integral water fountain in the FIG. 1 filtration system.

FIG. 3 depicts a right side assembly view of water fountain assembly 112. The major components of water fountain assembly 112 include flow indicator 114, gate valve 126, central wall 200, fill orifice wall 202, and drainage cavity wall 204.

Flow indicator 114 includes a transparent ovaloid window 206 having an inward bend conforming to the arcuate shape of outboard surface 208 on central wall 202. A metal pin 210 is received in central hub 212 of paddlewheel 214, and provides an axis of rotation for paddlewheel 214 on corresponding pin-retaining structure (not depicted) within flow discharge cavity 216. Paddlewheel 214 has a plurality of L-shaped spokes providing a means for rotating or spinning paddlewheel 214 responsive to water contact from water moving within discharge cavity 216. Transparent window 206 is bonded to surface 208 where it provides a water tight seal against water leakage from water discharge cavity 216. Paddlewheel 214 is visible through transparent window 206 when transparent window 206 is sealing water discharge cavity 216.

Gate valve 126 includes a rigid valve body 220 having an elongated cylindrical arcing body 222 and a thumb rest 224 connected to body 222. Flexible elastomeric seal 226 has a central cavity 228 that has sufficient dimensions for receiving therein cylindrical arcing body 222 with sufficient compression against cylindrical arcing body 222 to form a watertight seal therewith. Cylindrical arcing body 222 contains holes 230 and 232, which receive corresponding protrusions (not depicted) within central cavity 228 to prevent slippage from occurring between elastomeric seal 226 and cylindrical arcing body 222. Cylindrical arcing body 222 also includes a central aperture 234 in mutual alignment with opening 236 on elastomeric seal 226.

Figure 4:
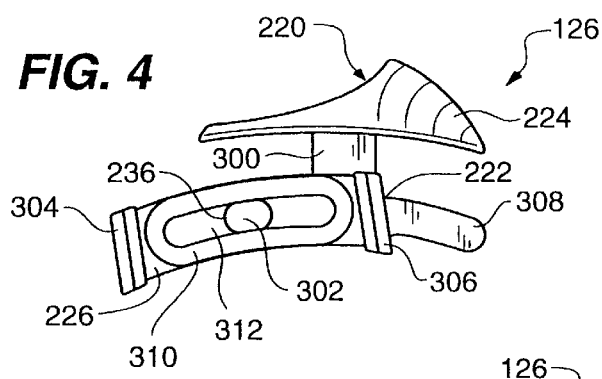
FIG. 4 illustrates a left side elevational view of a gate valve in the FIG. 1 water fountain.

FIG. 4 provides additional detail from a right side perspective of gate valve 126. A riser 300 connects thumb rest 224 to cylindrical arcing body 222. Elastomeric seal 226 is placed over cylindrical arcing body 222 to provide a contiguous passageway 302 formed in combination between opening and central aperture 234 (see FIG. 3). Cylindrical arcing body 222 includes a pair of integrally formed square end-capping segments 304 and 306, which are spaced a sufficient distance apart for receipt of elastomeric seal 226. Square end-capping segments 304 and 306 have outer perimeters exceeding the diameter of cylindrical arcing body 222 to prevent slippage and unintentional removal of elastomeric seal from its position around cylindrical arcing body 222. End-capping segment 306 includes a rounded nose 308. An ovaloid, rounded first sealing surface 310 protrudes outwardly from elastomeric seal 226 to provide an elongated interior recess 312 leading to passageway 302.

Figure 5:
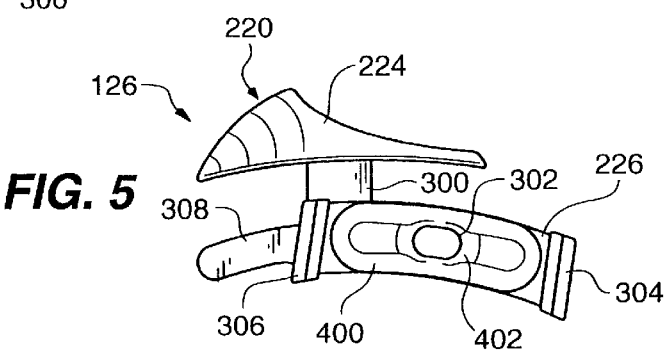
FIG. 5 illustrates a right side elevational view of the FIG. 4 gate valve.

FIG. 5 provides additional detail from a left side perspective of gate vale 126. An ovaloid, rounded second sealing surface 400 protrudes outwardly from elastomeric seal 226. A central, rounded third sealing surface 402 interior to second sealing surface circumscribes contiguous passageway 302. The dimensions of contiguous passageway 302 within third sealing surface 402 are substantially less than the dimensions of interior recess 312 within first sealing surface 310 (see FIG. 4).

Central wall 200 is generally shaped like a closed horseshoe with the forward end 240 containing structure for water fountain assembly 112. A compression spring 242 is received within a corresponding chamber 244. An elongated slot 246 receives riser 300 to permit longitudinal sliding motion of gate valve 126 with respect to slot 246. Ovaloid holes 248 and 250 are formed through far wall 252, which is recessed to provide a gate valve-receiving cavity 254.

Fill orifice wall 202 bonds to central wall 200, and functions to retain gate valve 126 (assembled as shown in FIGS. 4 and 5) within gate-valve-receiving cavity 254. Rounded nose 308 of gate valve 126 is inserted into end 256 of compression spring 242 prior to bonding fill orifice wall 202 in place. A raised cylindrical fill orifice seat 258 seals against an interior tubular member (not depicted) that carries filtered water from internal filter 110 (see FIG. 1) in a downstream path from the filter towards first and second outlets 120 and 124. Fill orifice seat 258 surrounds a slotted fill orifice 260, which discharges water into internal recess 312 of elastomeric seal 226.

First sealing surface 310 compresses in sealing engagement against the internal side of wall segment 262. Similarly, second sealing surface 400 and third sealing surface 402 (see FIG. 5) compress in sealing engagement against far wall 252. In the normal configuration, spring 242 biases gate-valve 126 to position end capping segment 304 against abutment 264. Accordingly, contiguous passageway 302 (see FIG. 4) is aligned to discharge water from internal recess 312 through hole 248. Third sealing surface 402 in this position prevents water from entering hole 250. Gate valve 112 may be moved against the bias of spring 242 to align contiguous passageway 302 for discharge of water through hole 250. In this second configuration, third sealing surface 402 prevents water from entering hole 248. Compression spring 242 returns gate valve 126 to the normal configuration with end-capping segment 304 against abutment 264 when the user releases thumb rest 224.

Drainage cavity wall 204 is bonded to central wall 200 opposite fill orifice wall 202. Divider 266 is positioned between holes 248 and 250 to separate a water fountain cavity 268 from a bottom drainage cavity 270. Water fountain cavity 268 connects hole 250 with second outlet 124. Bottom drainage cavity connects hole 248 with a tubular section 272 of central wall 200. In FIG. 3, tubular section 272 is shown for purposes of illustration with a portion of central wall 200 removed to reveal the tubular interior. Tubular section 272 leads to first outlet 120.

In operation, water travels through water filtration device 100 along flow pathway 134. In FIG. 1, flow pathway 134 is drawn atop water filtration device 100 for purposes of illustration, but schematically represents an internal pathway. Flow pathway 134 begins in an upstream position at inlet 118 find travels through filter 110 to the outlet side of filter 110 where the water is collected and delivered to water fountain assembly 112 through fill orifice seat 258. Water proceeds through water fountain assembly 112 in the manner described with reference to FIGS. 3–5. Accordingly, flow pathway 134 forms two branches within water fountain assembly 112. Branch 136 leads to second outlet 124 through hole 250 (see FIG. 3). Branch 138 through hole 248 leads to flow indicator assembly 114 and first outlet 120.

A user desiring to use filtration device 100 need only couple connector 116 with the end opening of any standard household faucet (not depicted). A conventional female to male swedge may be necessary to establish this connection if the household faucet has a female end. The user then opens a conventional cold water or hot water valve on the faucet to cause flow along flow pathway 134 and flow segment 138 through flow indicator assembly 114 and first outlet 120. The user observes the spinning of paddlewheel 214 responsive to the movement of water along flow segment 138, which provides assurance that leaks internal to water filtration device 120 have not bypassed filter 110. The user actuates thumb rest 224 in sliding motion along the direction of arrow 140 to align contiguous passageway 302 with hole 250. Thus, flow segment 138 is sealed, and flow occurs through flow segment 136. Flow segment 136 delivers a stream of water along arrow 132. The user drinks of this stream and releases thumb rest 224 when he or she is no longer thirsty.

It should be understood that filter 110 can be any filter or bed of purification material. Thus, any material including granular activated carbon, permeable carbon-resin blocks, halogenated ion exchange resins, flavor enhancers, calcium carbonate beds, salts, medicines, and other materials may be used. Furthermore, the specific flow geometry of the filter is not important, so long as the filter can be used to filter water that can be collected for delivery to the water fountain assembly 112. Other types of gate valves are useful, e.g., gate valves that rotate rather than slide. There are also more complicated structures that can be used in place of gate valves, such as a needle valve in combination with a spring-biased check valve positioned over one of holes 248 and 250.

Those skilled in the art will understand that the preferred embodiments, as described above, may be subjected to apparent modifications without departing from the true scope and spirit of the invention. Accordingly, the inventors hereby state their intention to rely upon the Doctrine of Equivalents for purposes of protecting their full rights in the invention.

We claim:

1. A faucet-mounted water filtration device for use in supplying drinking water on a demand basis comprising:
    a filter;
    a housing having structure defining:
        an inlet,
        a first outlet providing means for directing a flow of rater in a substantially downward direction,
            a second outlet providing means for directing said flow of water in a substantially upward direction, and
    an internal filter-receiving cavity containing said filter;
    means for sequentially guiding a flow of water in downstream direction from said inlet through said filter and out said first outlet,
    said means for sequentially guiding including valve means interposed between said filter and said second outlet for selectively directing said flow of water through said second outlet by diverting said flow of water from said first outlet,
    said valve means including a thumb rest, the thumb rest configured to supportedly engage a user's thumb, connected to a body of said valve means, said thumb rest protruding external to said housing for manual actuation of said valve means; and
    means for operably coupling said housing with a water faucet.

2. The water filtration device of claim 1 wherein said valve means includes a gate valve.

3. The water filtration device of claim 2 including means for biasing said gate valve towards a position permitting said means for sequentially guiding to direct said flow of water through said first outlet.

4. The water filtration device of claim 2 wherein said gate valve includes an elastomeric seal having a flow-through opening and a central body having a flow through aperture, said opening and said aperture being aligned to provide a contiguous flow-through passageway in said sequentially guiding means.

5. The water filtration of claim 4 wherein said elastomeric seal includes a first sealing surface formed of an ovaloid protrusion circumscribing said contiguous flow-through passageway orifice on a fill side of said passageway.

6. The water filtration device of claim 5 wherein said elastomeric seal includes a second sealing surface on an outlet side of said elastomeric seal formed of having an ovaloid protrusion circumscribing said contiguous flow-through orifice on said outlet side.

7. The water filtration device of claim 6 wherein said outlet side further includes a third seal surrounding said flow-through orifice and circumscribed by said second sealing surface.

8. The water filtration device of claim 4 wherein said housing includes a gate valve-receiving cavity having a wall therein with structure defining a first hole through said wall and a second hole through said wall, said contiguous passageway being aligned for discharge of water into one of said first hole and said second hole.

9. The water filtration device of claim 8 wherein said gate valve-receiving cavity has an arcuate shape and said central body has an arcuate axis of elongation to permit longitudinal sliding motion of said elongated body within said cavity.

10. The water filtration device of claim 1 wherein said sequentially guiding means includes a first hole leading to a first flow pathway segment connecting said first hole with said first outlet,
    a second hole leading to a second flow pathway segment connecting said second hole with said second outlet, and
    a wall separating said first aperture from said second aperture on a drain side of said valve means.

11. The water filtration device of claim 10 wherein said valve means is a gate valve providing means for selectively directing water through one of said first hole and said second hole.

12. The water filtration device of claim 10 wherein said first flow pathway segment includes means for visually indicating said flow of water when said flow of water is passing through said first flow pathway segment.

13. The water filtration device of claim 12 wherein said visually indicating means includes a transparent view window.

14. The water filtration device as set forth in claim 13 wherein said visually indicating means includes a rotatable member providing means for showing a rotation within view of said window when said flow of water is passing through said first flow pathway segment.

15. The water filtration device as set forth in claim 14 wherein said rotatable member is a paddle wheel.

16. A method of using a faucet-mounted water filtration device to supply drinking water on a demand basis, where said water filtration device includes a water control valve for dispensing filtered water and said water control valve is actuated for the selective flow of filtered water by manipulating a thumb rest connected to said water control valve, said method comprising the steps of:

connecting a water filtration device including a water fountain to a water faucet at a position downstream of a water control valve in a water faucet; and actuating said water control valve to flow water through said water filtration device for filtration of said water, wherein said step of actuating said water control valve includes manipulating a thumb rest, the thumb rest configured to supportedly engage a user's thumb operably coupled with a body of said water control valve to flow filtered water in a substantially upward direction.

17. The method as set forth in claim 16 wherein said step actuating said water control valve includes the step of actuating a gate valve by longitudinal sliding motion.

\* \* \* \* \*